United States Patent [19]

Morrison

[11] 4,035,536
[45] July 12, 1977

[54] SANDWICH PANEL CORE

[75] Inventor: Hadley F. Morrison, Downey, Calif.

[73] Assignee: McDonnell Douglas Corporation, Long Beach, Calif.

[21] Appl. No.: 554,615

[22] Filed: Mar. 3, 1975

[51] Int. Cl.² .................................... B32B 3/12
[52] U.S. Cl. .................... 428/118; 29/455 LM;
    52/630; 52/675; 244/119; 404/35; 404/36;
    428/178; 428/180; 428/116; 428/593
[58] Field of Search .............. 428/72, 73, 116, 118,
    428/178, 180, 183, 186, 188, 131, 132, 134,
    135; 52/615, 618, 630, 675; 29/183, 455 LM;
    244/119; 404/35, 36

[56] References Cited

U.S. PATENT DOCUMENTS

| 420,656 | 2/1890 | Hayes | 52/675 |
|---|---|---|---|
| 1,984,653 | 12/1934 | Palmer et al. | 428/178 X |
| 2,275,575 | 3/1942 | Vrooman | 428/172 X |
| 2,572,470 | 10/1951 | Gordon | 428/180 X |
| 3,011,602 | 12/1961 | Ensrud et al. | 428/180 |
| 3,086,899 | 4/1963 | Smith et al. | 428/158 |
| 3,137,602 | 6/1964 | Lincoln | 428/116 X |
| 3,231,454 | 1/1966 | Williams | 428/132 |
| 3,419,457 | 12/1968 | Bleasdale | 428/180 X |
| 3,561,177 | 2/1971 | Agro et al. | 428/310 X |
| 3,832,267 | 8/1974 | Liu | 428/167 |
| 3,834,487 | 9/1974 | Hale | 428/138 X |

OTHER PUBLICATIONS

Space Grid Structures by John Borrego, The MIT Press, (1968), Cambridge, Mass., p. 182.

Primary Examiner—George F. Lesmes
Assistant Examiner—Henry F. Epstein
Attorney, Agent, or Firm—John P. Scholl; Walter J. Jason; Donald L. Royer

[57] ABSTRACT

A core having a repetitive pattern for ribbing comprising triangles and hexagons where each side of any given hexagon is extended pinwheel fashion toward the appropriate side extensions of each of the six adjoining hexagons, all of the hexagons having sides extending to form pinwheels having the same sense, i.e., clockwise or counterclockwise. The triangles are defined by the extensions and are located between the hexagons. Panels using this core are stiff about all axes and do not have an angle of inherent weakness. The core may be stamped, rolled or vacuum-formed out of many materials including paper, cardboard, sheets of various metals and reinforced or thermosetting plastic.

6 Claims, 9 Drawing Figures

SANDWICH PANEL CORE

BACKGROUND OF THE PRESENT INVENTION

Sandwich panels consist of outer or face sheets separated by an inner core connected to their inside surfaces. They possess a high strength-to-weight ratio since they are light in weight and the core is configured to resist bending of the panel under stress. The inner core may be corrugated in one direction, corrugated in two directions, or have a waffle-type construction. Although they are relatively economical to produce, they have inherent weakness in certain directions of applied force and are weakened in bending stiffness to a greater or lesser degree because of the continuous linearity of the corrugation or waffle grids.

A typical honeycomb panel with an isotropic core provides good bending stiffness in all directions. While such panels exhibit good physical properties they are inherently more costly because of the core configuration itself.

SUMMARY OF THE PRESENT INVENTION

In accordance with the present invention, a sandwich panel core is configured which provides greater stress levels without buckling than conventional panel cores, enabling a savings in material and weight. The flanged effect of the grids provides a good contact surface for bonding or brazing to the panel face sheets. Its isotropic configuration provides for equal panel stiffness in all directions. The one-piece core can be stamped or rolled from sheet or roll stock, resulting in economies over honeycomb cores. Thermosetting plastic cores can be vacuum-formed. Uses for panels using these cores includes all applications where light weight and more economical panels might be used, ranging from very basic expendable cardboard cartons to aerospace applications such as aircraft and missile skin panels. The panel cores may be made from a variety of materials such as titanium, stainless steel, aluminum, reinforced plastic, thermosetting plastic, paper, cardboard, etc.

Briefly, the formulation of the core of the present invention displaced or breaks up the continuous linearity of the waffle grid lines found in a typical triangle waffle pattern. The intersection of the triangular waffles is expanded outwardly in pinwheel fashion from the initial triangular intersection and a center hexagon is constructed in line with the pinwheel displaced triangles. The geometric arrangement of the hexagons and triangles is such that when the core is used in a sandwich panel, it gives the panel isotropic characteristics similar to those found in the more expensive honeycomb core panels and its onepiece forming or stamping provides a flanged effect for more surface contact in subsequent attachment to the panel face sheets.

DETAILED DESCRIPTION OF ILLUSTRATIVE EMBODIMENT

Figure 1:
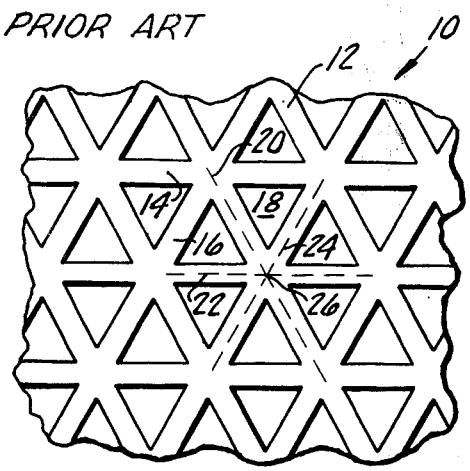
FIG. 1 is a plan view of a prior art triangular waffle configuration core.

Reference is now made to a prior art triangular grid core 10 in FIG. 1. Here a plurality of spaced diagonally extending ribs 12 intersect with spaced horizontal ribs 14 and with other diagonally extending ribs 16. Each of these ribs is channel-shaped in section and the triangular area 18 between the intersections may be cut out or be flat and interconnect the channel edges. Cores of this type are three-dimensional with the channel edges or flanges, and triangular area 18 if there is one, in one plane for connection to one face sheet of a panel and the channel loop or cross member in another plane spaced from the first for connection with the second face sheet of a panel. While such a core exhibits a moderate strength-to-weight ratio, it is to be noted that along the channel loops, i.e., along dashed lines 20, 22 and 24, the core has its weakest resistance to bending forces applied at right angles to those lines. It is the continuous uninterruption of the channel loops that causes or permits these lines of weakness. Point 26 is the point of intersection of the channel-shaped ribs 12, 14 and 16.

Figure 2:
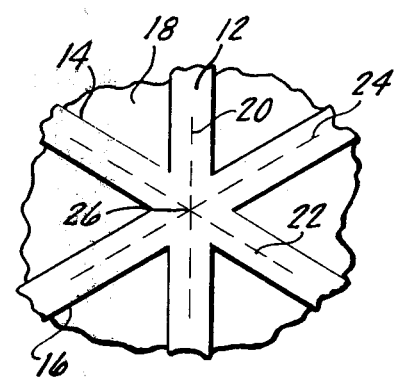
FIGS. 2, 3 and 4 are plan views illustrating the transformation of the core in FIG. 1 to the isotropic core of the present invention.
Figure 3:
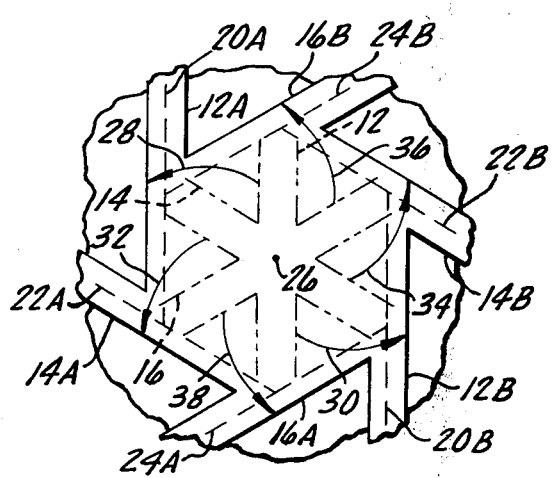

An enlarged fragmentary view of FIG. 1 is shown in FIG. 2. This view is illustrated in FIG. 3 in phantom lines 12, 14, 16 for comparison with the intersection of the channels or ribs 12A, 12B, 14A, 14B, 16A and 16B made in accordance with the present invention. Here it can be seen that these channels or ribs have been rotated about point 26, as shown by the pinwheel arrows 28, 30, 32, 34, 36 and 38, and portions thereof are spaced in equal and opposite directions from center 26. For example, rib 12 is now ribs 12A and 12B on opposite sides of point 26. Ribs 14A and 14B are on opposite sides and ribs 16A and 16B also are on opposite sides. They also approach the intersection from opposite sides. The lines of weakest resistance to bending, dashed lines 20A, 20B, 22A, 22B, 24A and 24B, follow these ribs but terminate without passing through their intersection with other ribs.

Figure 4:
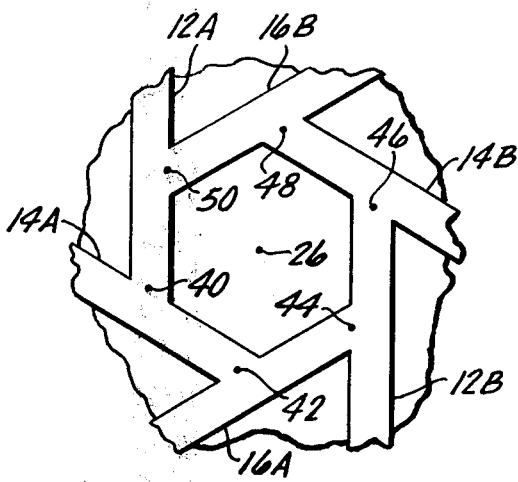

The merger of channels or ribs with each other at points hexagonally spaced from point 26 is shown in FIG. 4. For example, the centerline of rib 12A connects to rib 14A at point 40, the centerline of rib 14A connects with rib 16A at point 42, the centerline of rib 16A connects with rib 12B at point 44, the centerline of rib 12B connects with rib 14B at point 46, the centerline of rib 14B connects with rib 16B at point 48, and the centerline of rib 16B connects with rib 12A at point 50. The rib end segments between these points form a hexagon with the legs and points of intersection uniformly spaced about central point 26. The hexagonal area, as well as the triangular areas around it, may be a flat surface or an open area as desired, depending upon whether the core configuration is molded, cut from a thick core material or stamped from a thin sheet of material.

Figure 5:
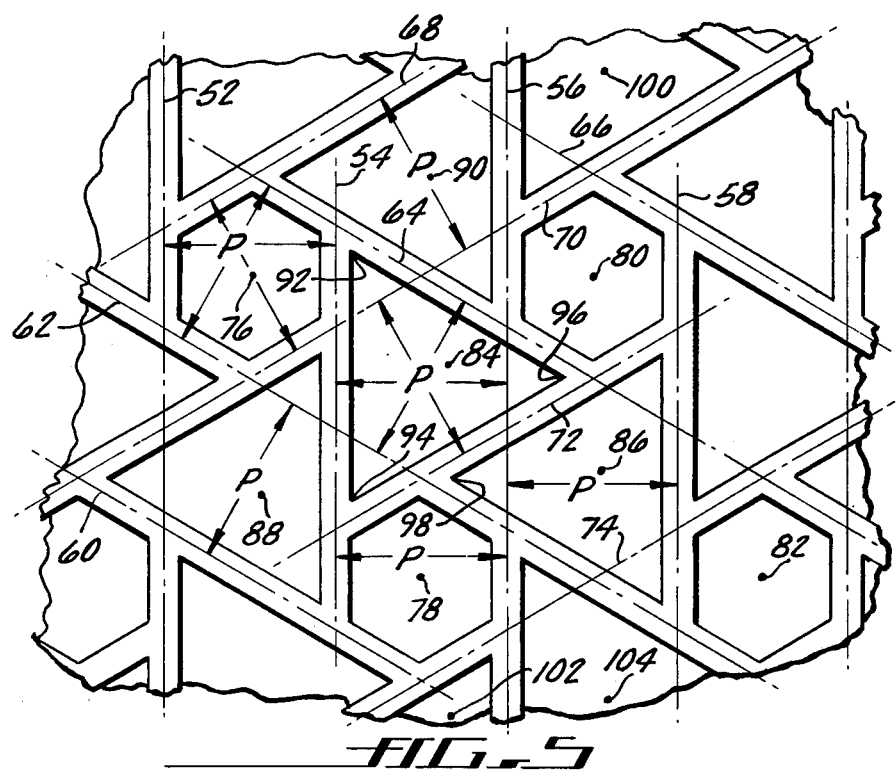
FIG. 5 is a plan view illustrating the core constructed directly, starting from any desired pitch (P)

FIG. 5 illustrates a simple approach to designing and laying out sandwich panel core in accordance with the present invention. Marking off the vertical spaced centerlines 52, 54, 56, 58 "P" distance apart is the first step. Next the diagonal spaced centerlines 60, 62, 64, 66 from upper left to lower right, are made at "P"

distance apart, followed by the diagonal spaced centerlines 68, 70, 72, 74 from lower left to upper right at "P" distance apart. Preferably, the diagonal lines are angularly oriented 60° from the vertical lines and with respect to one another. In this manner all sides of hexagonals having centers 76, 78, 80 and 82 have been formed from which either clockwise or counterclockwise extensions can be made to form the legs of the interconnecting triangles. Thus, triangle 84 is formed by the intesection of lines 54, 64 and 72. Triangle 86 is formed by the intersection of lines 58, 62 and 72. Triangle 88 is formed by the intersection of lines 54, 60 and 70, and triangle 90 is formed by the intersection of lines 56, 64 and 68. It should be noted that in all cases each apex of the triangle passes beyond the centerlines earlier drawn. Thus, the apexes 92, 94, 96 of triangle 84 pass beyond lines 70, 62 and 56, respectively. This causes an interruption along these lines which, but for this innovation, would have represented lines of weakest resistance to bending forces.

Apex 98 of triangle 86 crosses vertical line 56 from the opposite direction. Thus line 56, which is the base line of triangles 90, 100, 102 and 104, is interrupted by three legs of triangles 84, 86. This interruption along line 56 by the webs, strips or channels of the core extending in other directions reinforces and strengthens the core along this line. While line 56 was used as an example, the same is true for all the other lines which are interrupted by apexes of triangles.

Figure 7:
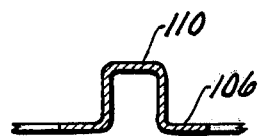
FIG. 7 is a sectional view taken along the line 7—7 of FIG. 6.
Figure 6:
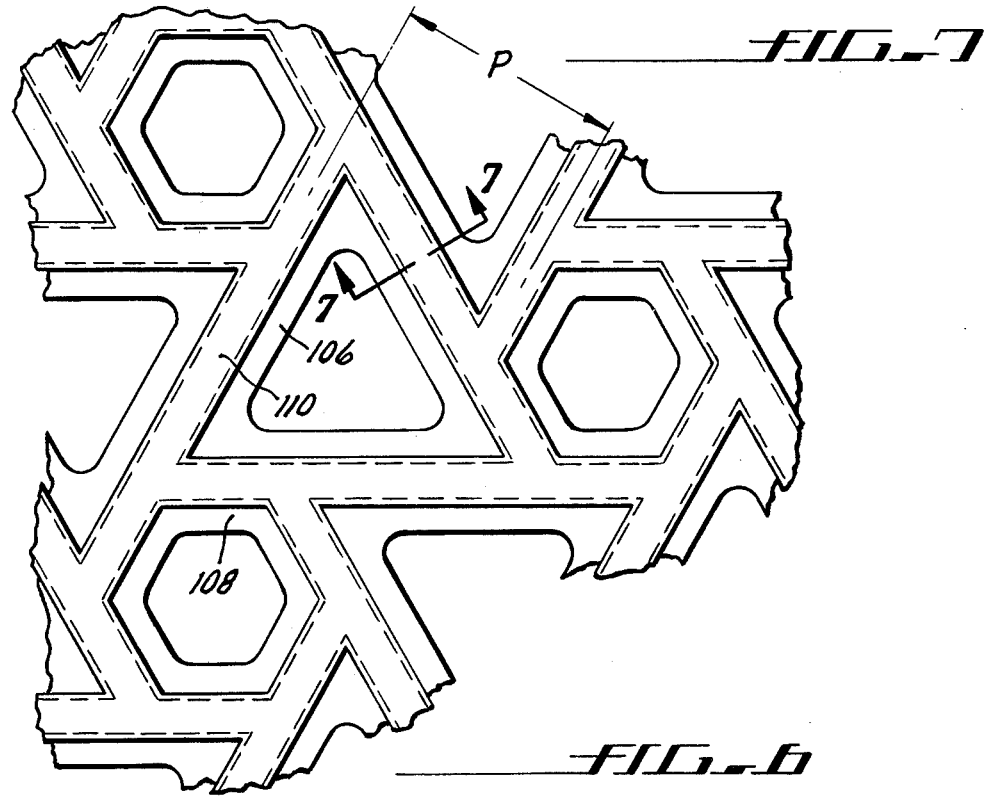
FIG. 6 is a plan view of an isotropic core stamped from the sheet material.

FIG. 6 is a plan view of a stamped isotropic core segment wherein the triangles 106 and hexagonals 108 are recessed in a plane below that of the ribs or channel sections 110. FIG. 7 shows this in a sectional elevational view. This recess spaces the opposing face sheets of the panel in which this core is to be used. The centers of the triangles and hexagonals are cut out for weight saving purposes, thus increasing the strength to weight ratio. While this core is intended to be used between face sheets of a panel, this core could be used per se in the construction or repair of roads, emergency landing fields or loading pads for cargo or construction materials.

Figure 8:
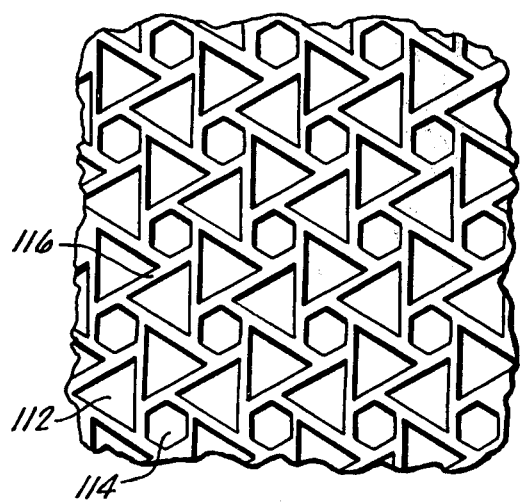
FIGS. 8 and 9 are plan views of alternate forms of isotropic core constructed from the present invention.
Figure 9:
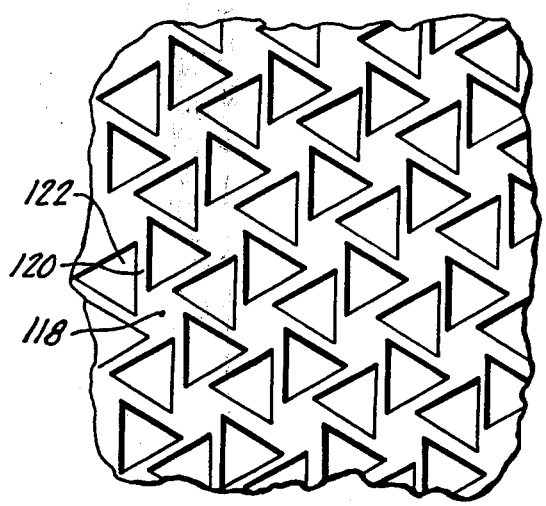

FIGS. 8 and 9 are alternate forms of core construction wherein from the present invention the triangles 112 and hexagonals 114 in FIG. 8 are cut from relatively thick core material 116. The thickness of the core material provides the spacing between the panel face sheets. This core has the same isotropic properties as honeycomb core but the construction is simplified compared to honeycomb because of the one-piece stamping or forming process. In FIG. 9 the core construction is from sheet material and omits the depression or stamping out of the hexagonals 118. With the omission of the central hexagon stamped pockets, the pinwheel ribs or channels 120, which define the unsymmetrically positioned cut-out triangles 122, offer fundamental isotropic stiffness although not as much as that in FIG. 8. This configuration permits cheaper tooling and is appropriate where panel stiffness is less of a concern.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, since various other obvious modifications may occur to persons having ordinary skill in the art.

What is claimed is:

1. A flat sandwich panel core deformed from a single flat sheet of material, said core having channel-shaped ribs in a repetitive pattern of triangles and hexagons, each hexagon having six equilateral triangles positioned therearound, and wherein each side of the hexagon is extended to a side of another hexagon, forming a triangle leg inbetween, said triangle leg being longer than the side of the hexagon.

2. A sandwich panel core as in claim 1 wherein said triangles are defined by extensions of and are located between said hexagons.

3. A sandwich panel core as in claim 1 wherein each side of said hexagon is extended in one direction only.

4. A sandwich panel core as in claim 1 wherein triangular portions of material are removed to provide a greater weight to strength ratio of said core.

5. A sandwich panel core as in claim 1 wherein triangular and hexagonal portions of material are removed to provide a greater weight to strength ratio of said core.

6. A sandwich panel core as in claim 1 wherein the sides of each triangle terminate at each end with a side of a hexagon and becomes an aligned extension thereof.

* * * * *